United States Patent [19]
Scott

[11] Patent Number: 5,948,249
[45] Date of Patent: Sep. 7, 1999

[54] PIPE SEAL CAPABLE OF USE WITH A FILTER BAG AND THE LIKE

[75] Inventor: Michael H. Scott, Berks, United Kingdom

[73] Assignee: YKK Corporation, Tokyo, Japan

[21] Appl. No.: 08/947,433

[22] Filed: Oct. 8, 1997

[30] Foreign Application Priority Data

Oct. 8, 1996 [GB] United Kingdom .................. 9620924

[51] Int. Cl.⁶ .......................... B01D 29/00; F16L 21/00
[52] U.S. Cl. ...................... 210/232; 210/416.1; 210/460; 210/486; 285/372; 285/373; 285/419
[58] Field of Search .................... 285/373, 419, 285/369, 372; 210/232, 238, 459, 460, 416.1, 486

[56] References Cited

U.S. PATENT DOCUMENTS

| | | |
|---|---|---|
| 1,767,523 | 6/1930 | Frankenhoff .......................... 210/232 |
| 3,310,322 | 3/1967 | Carroll . |
| 3,667,782 | 6/1972 | Viazzi . |
| 3,730,562 | 5/1973 | Viazzi . |
| 4,022,695 | 5/1977 | Howard et al. .......................... 210/486 |
| 4,174,985 | 11/1979 | Buidry . |
| 4,576,666 | 3/1986 | Harris et al. .............................. 156/85 |
| 4,583,770 | 4/1986 | Kreku et al. ....................... 285/148.26 |
| 4,869,683 | 9/1989 | Nelson . |
| 4,891,256 | 1/1990 | Kite, III et al. . |
| 4,951,978 | 8/1990 | Martin . |
| 5,104,159 | 4/1992 | Sugiyama . |
| 5,383,496 | 1/1995 | Bridges et al. . |

FOREIGN PATENT DOCUMENTS

| | | |
|---|---|---|
| 0 147 130 | 7/1985 | European Pat. Off. . |
| 1060914 | 3/1967 | United Kingdom . |
| 2 093 146 | 8/1982 | United Kingdom . |

Primary Examiner—Jay H. Woo
Assistant Examiner—Fred Prince
Attorney, Agent, or Firm—Hill & Simpson

[57] ABSTRACT

A sealing device 2 for forming a seal against an object such as a pipe surface 12 comprises a sealing strip 6 having a deformable inner pad 8, which is held tightly on the object by a slide fastener 18. The fastener 18 is preferably a hermetic zip fastener. A sealing device of the present invention may be used with a filter bag and the like.

18 Claims, 3 Drawing Sheets

PIPE SEAL CAPABLE OF USE WITH A FILTER BAG AND THE LIKE

FIELD OF THE INVENTION

The present invention relates to a pipe seal, and in particular to a device for forming a seal around the outside of a pipe.

BACKGROUND OF THE INVENTION

There are various applications in which a pipe is fed into a bag or other container, and it is desirable to have a simple way of forming a seal between the pipe and the mouth of the bag or container.

SUMMARY OF THE INVENTION

The present invention provides a device for forming a seal around the outside of a pipe, the device comprising a strip of sealing material arranged to be wrapped around the pipe to encircle the pipe and form a seal against the pipe surface, and a slide fastener mounted on opposite ends of the strip of sealing material and closable to join the ends together.

Preferably the slide fastener is a hermetically sealing slide fastener.

The seal may be part of a bag or other container, and the slide fastener may be arranged to close the mouth of the bag or container.

BRIEF DESCRIPTION OF THE DRAWINGS

The invention will be further described by way of example, with reference to the accompanying drawings, in which.

DETAILED DESCRIPTION OF PRESENTLY PREFERRED EMBODIMENTS

Figure 1:
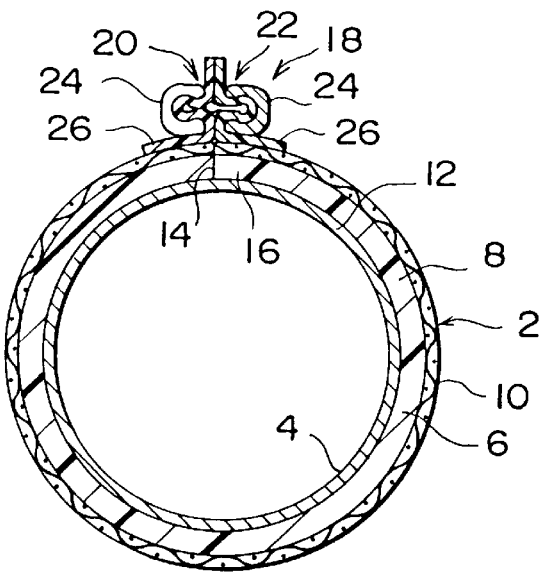
FIG. 1 is a cross-section through a sealing device forming an embodiment of the invention, mounted on a pipe.

Referring to FIG. 1, a sealing device 2 of the invention is shown mounted on a pipe 4. The sealing device comprises a sealing strip 6 comprising a pad of deformable or resilient material 8 having a backing sheet 10. The pad 8 and backing sheet 10 which is resistant to stretching and dimensioned to fit around the pipe, the backing sheet 10 urging the pad 8 onto the pipe outer surface 12 when the ends 14, 16 of the strip 6 are abutting. To hold the ends 14, 16 together, a hermetically sealing slide fastener 18, here in the form of a zip fastener, has a stringer 20, 22 attached to the backing sheet 10 at each end 14, 16. The elements 24 of the fastener 18 are coupled together, to close the fastener, and so hold the pad 8 snugly against the pipe surface 12.

The fastener shown in FIG. 1 has two separate airtight seals. The ends 14, 16 of the fastener abut to provide one airtight seal, and the slide fastener 18 provides a second airtight seal. The two seals are arranged "in series", so that the fastener as a whole would still be airtight if one of the two seals were to fail. In some applications it may be sufficient for the fastener to have only one airtight seal, and in this case the fastener 18 need not be of the hermetically sealing type, if the ends 14, 16 abut together sufficiently to provide an airtight seal.

Figure 2:
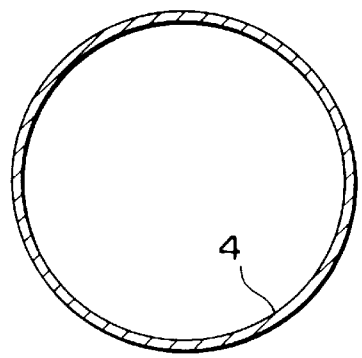
FIG. 2 illustrates the attachment of the sealing device of FIG. 1 to a pipe.
Figure 2:
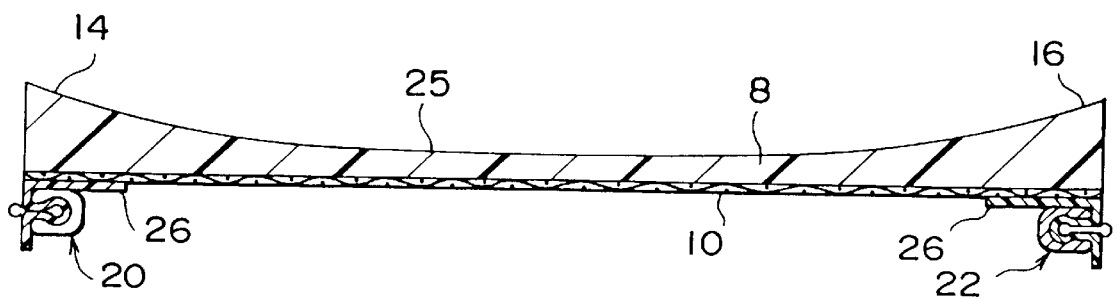

Referring to FIG. 2, this shows the sealing device 2 opened out prior to wrapping around the pipe. The pad 8 is about 3 mm thick at the ends 14, 16 and 2 mm thick in the centre region 25. Accordingly, the pad 8 has a variable thickness prior to being secured to the pipe 4.

Figure 3:
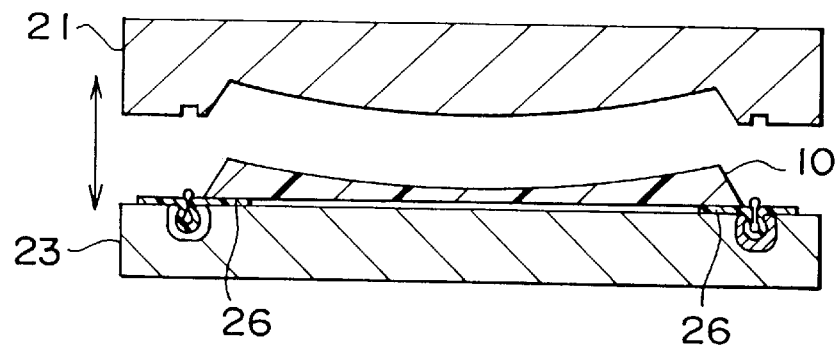
FIG. 3 shows a device for manufacturing the sealing device of FIG. 1.

The pad 8 and backing sheet 10 are both of neoprene rubber material, as is the support tape 26 of the fastener stringers 20, 22. The stringers 20, 22 are bonded to the backing sheet 10 with adhesive. Referring to FIG. 3, the pad 8 may be moulded in-situ on the backing sheet between mould halves 21, 23 or bonded to it with adhesive or heat.

Figure 4:
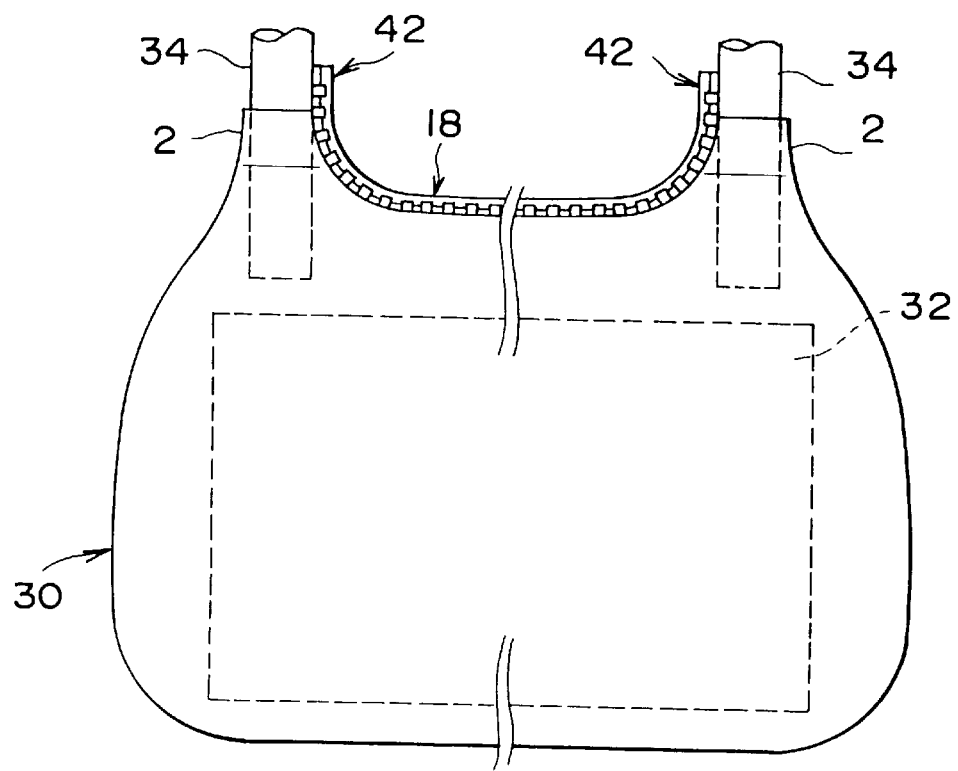
FIG. 4 illustrates a filter bag which is a particular application for the embodiment of FIG. 1.
Figure 5:
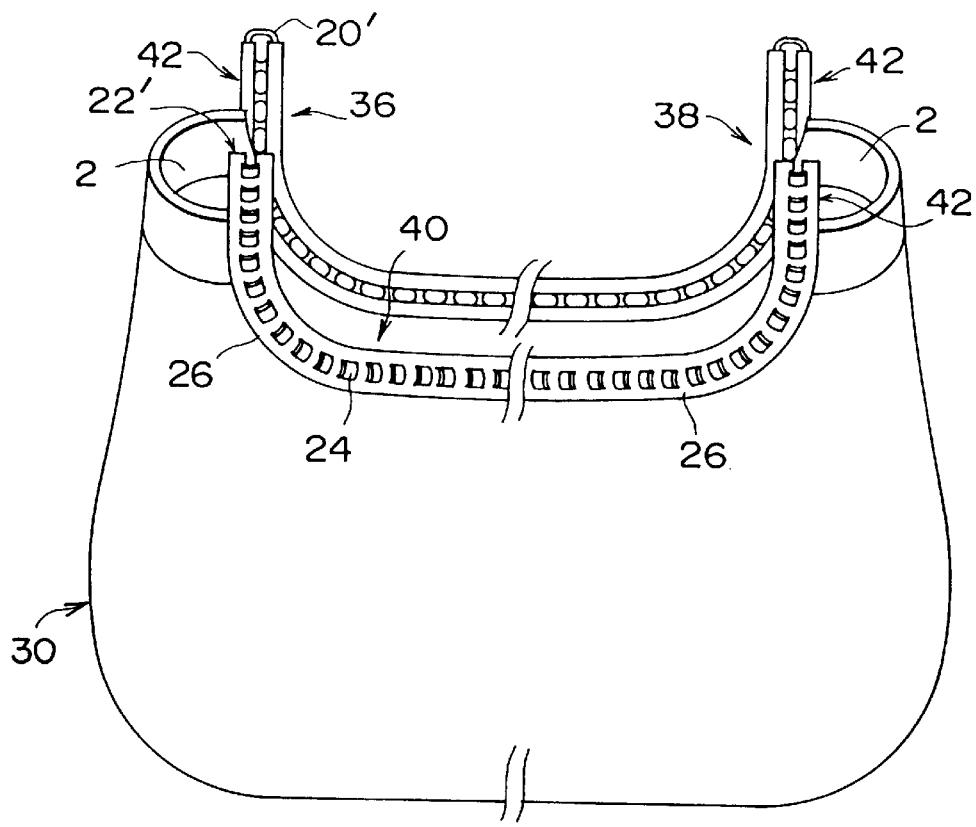
FIG. 5 is a view of the mouth of the bag of FIG. 4.

FIGS. 4 and 5 illustrate a particular use of the invention in a CROSIBLE (trade name) filter bag 30. The bag 30 is of porous, filter material and fits around an apertured support 32. The bag 30 and support 32 are immersed in the liquid to be filtered, and liquid is filtered by suction through pipes 34. The life of a bag is typically six months, after which it is disposed of. At each end 36, 38 of the mouth 40 of the bag 30 a sealing device 2 is provided. A single zip fastener 18 closes the sealing devices 2, and also runs along the mouth 40 of the bag 30 to close the bag.

The sealing element 2 provides an airtight seal around the two pipes 34, which are connected to a vacuum pump or other suitable device. Using the sealing element 2 avoids the need to provide airtight seals between the pipes 34 and the support 32, so making it easier and quicker to remove an old filter bag and fit an new filter bag.

The ends 42 of the fastener 18 extend beyond the sealing device 2 to facilitate the attachment of a removable slider (not shown) at the end of the fastener 18. Hermetic fasteners usually have a strong coupling force between the elements and so will not easily pull apart at their ends. By extending the fastener beyond the sealing devices 2, any force tending to pull the elements apart will not act to pull apart the ends of the stringers The sealing pads 8 have a conical outer surface, as this makes it easier to close the fastener.

Figure 6:
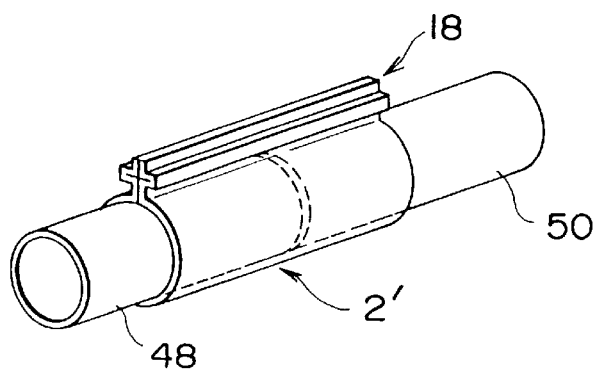
FIG. 6 is a view of another application of the invention.

A further application of the present invention is shown in FIG. 6. The sealing device 2' is used to join two pipes 48, 50 to one another. This provides a joint between the two pipes which is airtight and which can readily be made or disassembled. The sealing device could also be used to seal a leak in a pipe.

In use the open bag is fitted over the support 32 from the bottom and the fastener closed to seal the bag around the pipes 34 and support 32. Thus, the invention provides a very simple and efficient way of removably attaching a bag or the like to a pipe.

I claim:

1. A sealing device comprising a strip of sealing material, and a slide fastener mounted on opposite ends of the strip of sealing material for securing the strip about an object, the opposite ends of the strip of sealing material extending along a longitudinal direction, the strip of sealing material having a thickness gradually increasing in a transverse direction toward the opposite ends prior to being secured to the object.

2. A sealing device comprising a strip of sealing material arranged to be wrapped around a pipe to encircle the pipe and form a seal against the pipe surface, and a slide fastener mounted on opposite ends of the strip of sealing material for securing the strip about the pipe, the opposite ends of the strip of sealing material extending along a longitudinal direction, the strip of sealing material having a thickness gradually increasing in a transverse direction toward the opposite ends prior to being secured to the pipe.

3. A sealing device as claimed in claim 2, wherein the strip comprises a deformable pad which bears on the pipe surface.

4. A sealing device as claimed in claim 3, wherein the pad is mounted on a stretch resistant backing sheet.

5. A sealing device as claimed in any preceding claim wherein a hermetic zip fastener is mounted on the strip, a respective stringer being mounted on each end of the strip.

6. A filter bag comprising a sealing device as defined in any one of claims 1 to 4.

7. A filter bag as claimed in claim 6 wherein the slide fastener also seals the mouth of the bag.

8. A filter bag comprising a sealing device as defined in claim 5.

9. A filter bag as claimed in claim 8, wherein the slide fastener also seals the mouth of the bag.

10. A sealing device as claimed in any one of claims 1 to 4, wherein the strip of sealing material has opposed ends having thicknesses greater than a thickness between the ends.

11. A sealing device as claimed in any one of claims 1 to 4, wherein the strip of sealing material has a conical outer surface.

12. A sealing device as claimed in claim 5, wherein the strip of sealing material has opposed ends having thicknesses greater than a thickness between the ends.

13. A sealing device as claimed in claim 5, wherein the strip of sealing material has conical outer surface.

14. A filter bag comprising a sealing device comprising a strip of sealing material, and a slide fastener mounted on opposite ends of the strip of sealing material for securing the strip about an object, the strip of sealing material having a variable thickness prior to being secured to the object.

15. A filter bag comprising a sealing device as claimed in claim 14, wherein a hermetic zip fastener is mounted on the strip, a respective stringer being mounted on each end of the strip.

16. A filter bag comprising a sealing device comprising a strip of sealing material arranged to be wrapped around a pipe to encircle the pipe and form a seal against the pipe surface, and a slide fastener mounted on opposite ends of the strip of sealing material for securing the strip about the pipe, the strip of sealing material having a variable thickness prior to being secured to the pipe.

17. A filter bag comprising a sealing device as claimed in claim 16, wherein the strip comprises a deformable pad which bears on the pipe surface.

18. A filter bag comprising a sealing device as claimed in claim 16, wherein a hermetic zip fastener is mounted on the strip, a respective stringer being mounted on each end of the strip.

\* \* \* \* \*